US010372962B2

(12) United States Patent
Wright et al.

(10) Patent No.: US 10,372,962 B2
(45) Date of Patent: Aug. 6, 2019

(54) ZERO FINGERPRINT ENROLLMENT SYSTEM FOR AN ELECTRONIC DEVICE

(71) Applicant: Apple Inc., Cupertino, CA (US)

(72) Inventors: John A. Wright, San Francisco, CA (US); Byron B. Han, Cupertino, CA (US); Craig A. Marciniak, San Jose, CA (US)

(73) Assignee: Apple Inc., Cupertino, CA (US)

( * ) Notice: Subject to any disclaimer, the term of this patent is extended or adjusted under 35 U.S.C. 154(b) by 312 days.

(21) Appl. No.: 15/470,548

(22) Filed: Mar. 27, 2017

(65) Prior Publication Data

US 2017/0200039 A1    Jul. 13, 2017

Related U.S. Application Data

(63) Continuation-in-part of application No. 13/841,287, filed on Mar. 15, 2013, now abandoned.
(Continued)

(51) Int. Cl.
*G06K 9/00* (2006.01)
(52) U.S. Cl.
CPC ..... *G06K 9/00026* (2013.01); *G06K 9/00087* (2013.01); *G06K 9/00926* (2013.01)
(58) Field of Classification Search
CPC ........... G06K 9/00026; G06K 9/00087; G06K 2009/00953; G06K 9/00006;
(Continued)

(56) References Cited

U.S. PATENT DOCUMENTS

| 4,208,651 A | 6/1980 | McMahon |
|---|---|---|
| 5,659,626 A | 8/1997 | Ort |

(Continued)

FOREIGN PATENT DOCUMENTS

| CN | 101079087 | 3/2005 |
|---|---|---|
| EP | 1302907 | 4/2003 |

(Continued)

OTHER PUBLICATIONS

Anonymous, "WordPress› Limit Login Attempts < WordPress Plugins," Apr. 19, 2014, XP055202312, Retrieved from the Internet: URL:https://web.archive.org/web/20140419102326/http://wordpress.org/plugins/limit-login-attempts/screenshots/ [retrieved on Jul. 14, 2015], 3 pages.

(Continued)

*Primary Examiner* — Nirav G Patel
(74) *Attorney, Agent, or Firm* — Brownstein Hyatt Farber Schreck, LLP (57) ABSTRACT

This application provides techniques, including circuits and designs, which can receive information with respect to fingerprint images, or portions thereof, and which can be incorporated into devices using fingerprint recognition. This application also provides techniques, including devices which perform fingerprint recognition and methods which can be performed by those devices. In one embodiment, techniques can include providing a fingerprint recognition sensor in which one or more portions of each fingerprint can be collected as they are identified, and those portions can be combined into a unified fingerprint template. In this way, collection and enrollment of fingerprints may be simplified for users.

20 Claims, 7 Drawing Sheets

Related U.S. Application Data (60) Provisional application No. 61/666,717, filed on Jun. 29, 2012.

(58) Field of Classification Search
 CPC ............. G06K 9/00013; G06K 9/0002; G06K 9/00912; G06K 9/00926; G06K 9/209; G06F 21/32; G06F 3/0227
 See application file for complete search history.

(56) References Cited

U.S. PATENT DOCUMENTS

| | | | |
|---|---|---|---|
| 5,799,098 | A | 8/1998 | Ort |
| 5,926,555 | A | 7/1999 | Ort |
| 5,982,914 | A | 11/1999 | Lee et al. |
| 5,999,098 | A | 12/1999 | Lian |
| 6,289,114 | B1 | 9/2001 | Mainguet |
| 6,323,846 | B1 | 11/2001 | Westerman et al. |
| 6,546,122 | B1 | 4/2003 | Russo |
| 6,570,557 | B1 | 5/2003 | Westerman et al. |
| 6,677,932 | B1 | 1/2004 | Westerman |
| 6,795,569 | B1 | 9/2004 | Setlak |
| 6,888,536 | B2 | 5/2005 | Westerman et al. |
| 6,898,301 | B2 | 5/2005 | Iwanaga |
| 6,950,540 | B2 | 9/2005 | Higuchi |
| 6,961,452 | B2 | 11/2005 | Fujii |
| 7,103,200 | B2 | 9/2006 | Hillhouse |
| 7,151,846 | B1 | 12/2006 | Fujii |
| 7,194,116 | B2 | 3/2007 | Du et al. |
| 7,194,393 | B2 | 3/2007 | Wei |
| 7,280,677 | B2 | 10/2007 | Chandler et al. |
| 7,372,979 | B2 | 5/2008 | Hillhouse |
| 7,512,571 | B2 | 3/2009 | Rudolf |
| 7,549,161 | B2 | 6/2009 | Poo et al. |
| 7,599,530 | B2 | 10/2009 | Boshra |
| 7,616,787 | B2 | 11/2009 | Boshra |
| 7,693,314 | B2 | 4/2010 | Tykowski et al. |
| 8,131,026 | B2 | 3/2012 | Benkley et al. |
| 8,255,699 | B2 | 8/2012 | Tagscherer |
| 8,295,561 | B2 | 10/2012 | Kwan |
| 8,296,573 | B2 | 10/2012 | Bolle |
| 8,358,815 | B2 | 1/2013 | Benkley et al. |
| 8,482,381 | B2 | 7/2013 | Chatterjee et al. |
| 8,605,960 | B2 | 12/2013 | Orsley |
| 8,611,618 | B2 | 12/2013 | Kwon et al. |
| 8,736,421 | B2 | 5/2014 | Abe |
| 8,796,881 | B2 | 8/2014 | Davis |
| 8,824,749 | B2 | 9/2014 | Leyvand et al. |
| 8,913,801 | B2 | 12/2014 | Han et al. |
| 8,913,802 | B2 | 12/2014 | Han et al. |
| 9,043,941 | B2 | 5/2015 | Yamada et al. |
| 9,152,842 | B2 | 10/2015 | Vieta et al. |
| 9,268,991 | B2 | 2/2016 | Russo et al. |
| 9,348,987 | B2 | 5/2016 | Boshra |
| 9,436,862 | B2 | 9/2016 | Chang |
| 9,483,758 | B2 | 11/2016 | Rhee et al. |
| 9,514,351 | B2 | 12/2016 | Boshra |
| 9,576,126 | B2 | 2/2017 | Boshra et al. |
| 2003/0123715 | A1* | 7/2003 | Uchida .............. G06K 9/00026 382/124 |
| 2004/0146186 | A1 | 7/2004 | Gelbord et al. |
| 2007/0036400 | A1 | 2/2007 | Watanabe |
| 2007/0263912 | A1 | 11/2007 | Biarnes et al. |
| 2008/0155269 | A1 | 6/2008 | Yoshikawa |
| 2010/0182123 | A1 | 7/2010 | Press |
| 2011/0044513 | A1 | 2/2011 | McGonagle et al. |
| 2013/0064434 | A1 | 3/2013 | Riopka et al. |
| 2013/0207779 | A1 | 8/2013 | Uno et al. |
| 2013/0223696 | A1 | 8/2013 | Azar et al. |
| 2013/0279768 | A1 | 10/2013 | Boshra |
| 2014/0003681 | A1 | 1/2014 | Wright et al. |
| 2015/0139512 | A1 | 5/2015 | Han et al. |
| 2015/0349959 | A1 | 12/2015 | Marciniak |
| 2017/0262688 | A1 | 9/2017 | Han et al. |
| 2018/0204080 | A1* | 7/2018 | Thieme ............. G06K 9/00067 |
| 2018/0211093 | A1* | 7/2018 | Bae .................... G06K 9/00087 |

FOREIGN PATENT DOCUMENTS

| | | |
|---|---|---|
| EP | 1519326 | 3/2005 |
| EP | 1533759 | 5/2005 |
| TW | 201120763 | 6/2011 |

OTHER PUBLICATIONS

Cappelli, "SFinGe: an Approach to Synthetic Fingerprint Generation," DEIS, University of Bologna, Italy, 2004.

Nasser et al., "User Interface Design of the Interactive Fingerprint Recognition (INFIR) System," Proceedings of the 2006 International Conference on Security & Management, SAM 2006, Jun. 26, 2009, pp. 371-377, XP055084842, retrieved from the Internet on Oct. 22, 2013: URL:http://wwl.ucmss.com/books/LFS/CSREA2006/SAM8023.pdf.

Riley et al., "Instruction, Feedback and Biometrics: The User Interface for Fingerprint Authentication Systems," Human-Computer Interaction A Interact, 2009, Springer Berlin Heidelberg, pp. 293-305, XP019126310, ISBN: 978-3-642-03657-6.

Ryu et al., "Template Adaptation based Fingerprint Verification," Pattern Recognition, 2006, ICPR 2006, 18th International Conference on vol. 4, IEEE, 2006, 4 pages.

Söderlund, "How do I best tell a user that his/her account will be locked if they enter the wrong credentials too many times?", Jul. 30, 2013, XP055202317, Retrieved from the Internet: URL:https://web.archive.org/web/20130730052456/http://us.stackexchange.com/questions/25621/how-do-i-best-tell-a-user-that-his-her-account-will-be-locked-if-they-enter-the [retrieved on Jul. 14, 2015], 3 pages.

Uz et al., "Minutiae-Based Template Synthesis and Matching Using Hierarchical Delaunay Triangulations," *Biometrics: Theory, Applications, and Systems,* 2007, First IEEE International Conference, Sep. 1, 2007, pp. 1-8, XP031189988, ISBN: 978-1-4244-1596-0, Section II, IV, V.

U.S. Appl. No. 16/287,943, filed Feb. 27, 2019, Han et al.

* cited by examiner

ZERO FINGERPRINT ENROLLMENT SYSTEM FOR AN ELECTRONIC DEVICE

CROSS-REFERENCE TO RELATED APPLICATIONS

The present application is a continuation-in-part of U.S. patent application Ser. No. 13/841,287, filed Mar. 15, 2013, and entitled "Zero Fingerprint Enrollment System for an Electronic Device," which claims the benefit under 35 U.S.C. § 119(e) to U.S. Provisional Patent Application No. 61/666,717, filed Jun. 29, 2012, and entitled "Zero Enrollment," both of which are incorporated by reference in their entirety as if fully disclosed herein.

FIELD

This application generally relates to fingerprint sensors.

BACKGROUND

Fingerprint recognition systems generally provide for collection of fingerprint information and comparing that information against a database of known fingerprints. For example, a set of known fingerprints for an authorized user can be collected, and a accessing user can be authorized by comparing fingerprint information for that accessing user against known fingerprint information for that authorized user. This generally involves collecting fingerprints from the authorized user and enrolling those collected fingerprints in that database of known fingerprint information.

It sometimes occurs that collecting fingerprints from the authorized user involves a user interface, in which the authorized user enters one or more fingerprints, those fingerprints are processed if necessary to provide fingerprint information, and that fingerprint information is enrolled in a database associated with that authorized user. For example, a user interface might request that the authorized user enter one or more fingerprints for each of their fingers, and might construct one or more data structures including fingerprint information, so that new fingerprints can be compared with the fingerprint information enrolled in those data structures.

It sometimes occurs that the process of collecting fingerprints from the authorized user, using that user interface, is time consuming. This can have the effect that the authorized user finds the operation of collecting and enrolling fingerprints to be tedious, or otherwise impractical.

It sometimes occurs that the process of collecting fingerprints from the authorized user, using that user interface, interrupts operations the authorized user is attempting to perform. This can have the effect that the authorized user finds the operation of collecting and enrolling fingerprints to be a hindrance, or otherwise impractical.

Each of these examples, as well as other possible considerations, can cause difficulty for the authorized user in their interaction with the fingerprint recognition sensor, and in their interaction with the device incorporating the fingerprint recognition sensor (such as a computing device using fingerprint recognition for authentication). For example, as noted above, the authorized user might find a user interface for collecting and enrolling fingerprints to be annoying or otherwise impractical, and might shy away from using that user interface. This might have the effect that the fingerprint recognition sensor remains unused, or is used less effectively than otherwise possible.

SUMMARY

This application provides techniques, including circuits and designs, which can receive information with respect to fingerprint images, or portions thereof, and which can be incorporated into devices using fingerprint recognition. This application also provides techniques, including devices which perform fingerprint recognition and methods which can be performed by those devices.

In one embodiment, techniques can include providing a fingerprint recognition sensor in which one or more portions of each fingerprint can be collected as they are identified, and those portions can be combined into a unified fingerprint template. The unified fingerprint template can be enrolled without a user interface, and automatically credentialed. For example, a fingerprint recognition sensor can receive one or more portions of fingerprints, maintain those portions in memory or storage, combine received portions when appropriate, enroll fingerprint information when portions are combined into a substantially complete fingerprint, and automatically associate that fingerprint information with credentials for a user who has that fingerprint. As described herein, partial and enrolled fingerprints can be maintained in memory or storage and manipulated by a computing device, in response to and interactively with a physical contact or proximity to one or more of a user's fingerprints.

In one embodiment, techniques can include maintaining a partially unified fingerprint collected from portions thereof, matching further portions of fingerprints with that partially unified fingerprint, expanding that partially unified fingerprint, and identifying when that partially unified fingerprint is adequate for use as a substantially complete fingerprint. For example, a fingerprint recognition sensor can maintain one or more partially unified fingerprints, and combine those partially unified fingerprints with each other when appropriate.

In one embodiment, techniques can include maintaining a partially unified fingerprint collected from portions thereof, identifying further portions of fingerprints which might match with that partially unified fingerprint, tentatively matching those further portions, and rejecting tentative matches in response to new information. For a first example, that new information can include a result of testing the partially unified fingerprint using received fingerprint information. For a second example, that new information can include a measure of quality of those further portions. For a third example, then new information can include a measure of quality of matching those further portions with that partially unified fingerprint.

While multiple embodiments are disclosed, including variations thereof, still other embodiments of the present disclosure will become apparent to those skilled in the art from the following detailed description, which shows and describes illustrative embodiments of the disclosure. As will be realized, the disclosure is capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the present disclosure, it is believed that the disclosure will be better understood from the following description taken in conjunction with the accompanying Figures, in which:

DETAILED DESCRIPTION

This application provides techniques, including circuits and designs, which can receive information with respect to fingerprint images, or portions thereof, and which can be incorporated into devices using fingerprint recognition. This application also provides techniques, including devices which perform fingerprint recognition and methods which can be performed by those devices. Embodiments described herein may be configured to operate with a variety of sensors, including strip or swipe sensors, array or other two-dimensional sensors, and the like. In one embodiment, techniques can include providing a fingerprint recognition sensor in which one or more portions of each fingerprint can be collected as they are identified, and those portions can be combined into a unified fingerprint template. In this way, collection and enrollment of fingerprints may be simplified for users.

Terminology

Terms and phrases used herein are intended to be exemplary, not limiting in any way. Some examples of terms and phrases used herein include the following:

The text "node", and variants thereof, generally refers to an individual portion of the fingerprint, or information representative thereof, such as might be collected by a fingerprint recognition sensor. For example, a node can include a block of fingerprint data's received by the fingerprint recognition sensor, and can be maintained by the fingerprint recognition sensor as described herein.

The text "mosaic", and variants thereof, generally refers to a partially unified fingerprint, or information representative thereof, collected from one or more nodes. For example, one or more mosaics can be maintained by the fingerprint recognition sensor as described herein.

The text "template", and variants thereof, generally refers to a substantially complete fingerprint, or information representative thereof. For example, a template can be constructed from one or more mosaics, or a mosaic and one or more additional nodes. A template can also be received in response to a user interface.

After reading this application, those skilled in the art would recognize that these statements of terminology would be applicable to techniques, methods, physical elements, and systems (whether currently known or otherwise), including extensions thereof inferred or inferable by those skilled in the art after reading this application.

Fingerprint Sensor System

Figure 5:
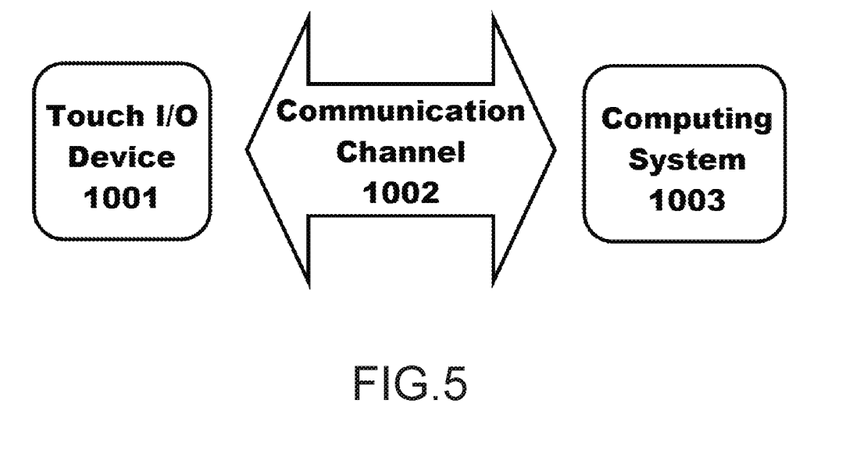
FIG. 5 shows a conceptual drawing of communication between a touch I/O device and a computing system.

FIG. 5 shows a conceptual drawing of communication between a touch I/O device and a computing system.

Described embodiments may include touch I/O device 1001 that can receive touch input for interacting with computing system 1003 via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a laptop) or may be separate from computing system 1003.

For example, touch I/O device 1001 can interact with a user with the user touching the touch I/O device 1001 with the user's finger (or otherwise bringing the user's finger near to the touch I/O device 1001), with the effect that the touch I/O device 1001 can receive fingerprint image data, and optionally provide feedback to the user that the fingerprint image data was received.

Touch I/O device 1001 may include a touch sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard, a tablet computing device, a smart phone and the like) or any multi-dimensional object having a touch sensitive surface for receiving touch input.

In one example, touch I/O device 1001 embodied as a touch screen may include a transparent and/or semitransparent touch sensitive panel partially or wholly positioned over at least a portion of a display. According to this embodiment, touch I/O device 1001 functions to display graphical data transmitted from computing system 1003 (and/or another source) and also functions to receive user input. In other embodiments, touch I/O device 1001 may be embodied as an integrated touch screen where touch sensitive components/devices are integral with display components/devices. In still other embodiments a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures or fingerprints. A gesture or fingerprint may correspond to stationary or non-stationary, single or multiple, touches or near touches on touch I/O device 1001. A gesture or fingerprint may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture or fingerprint may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other embodiments, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner. For example, feedback can include interaction with a user indicating (A) that one or more sets of fingerprint image information have been received, (B) that one or more sets of fingerprint image information have been enrolled in a database, and possibly what credentials have been associated with those one or more sets of fingerprint image information, (C) that one or more sets of fingerprint image information have been confirmed as associated with the user, or otherwise.

Figure 6:
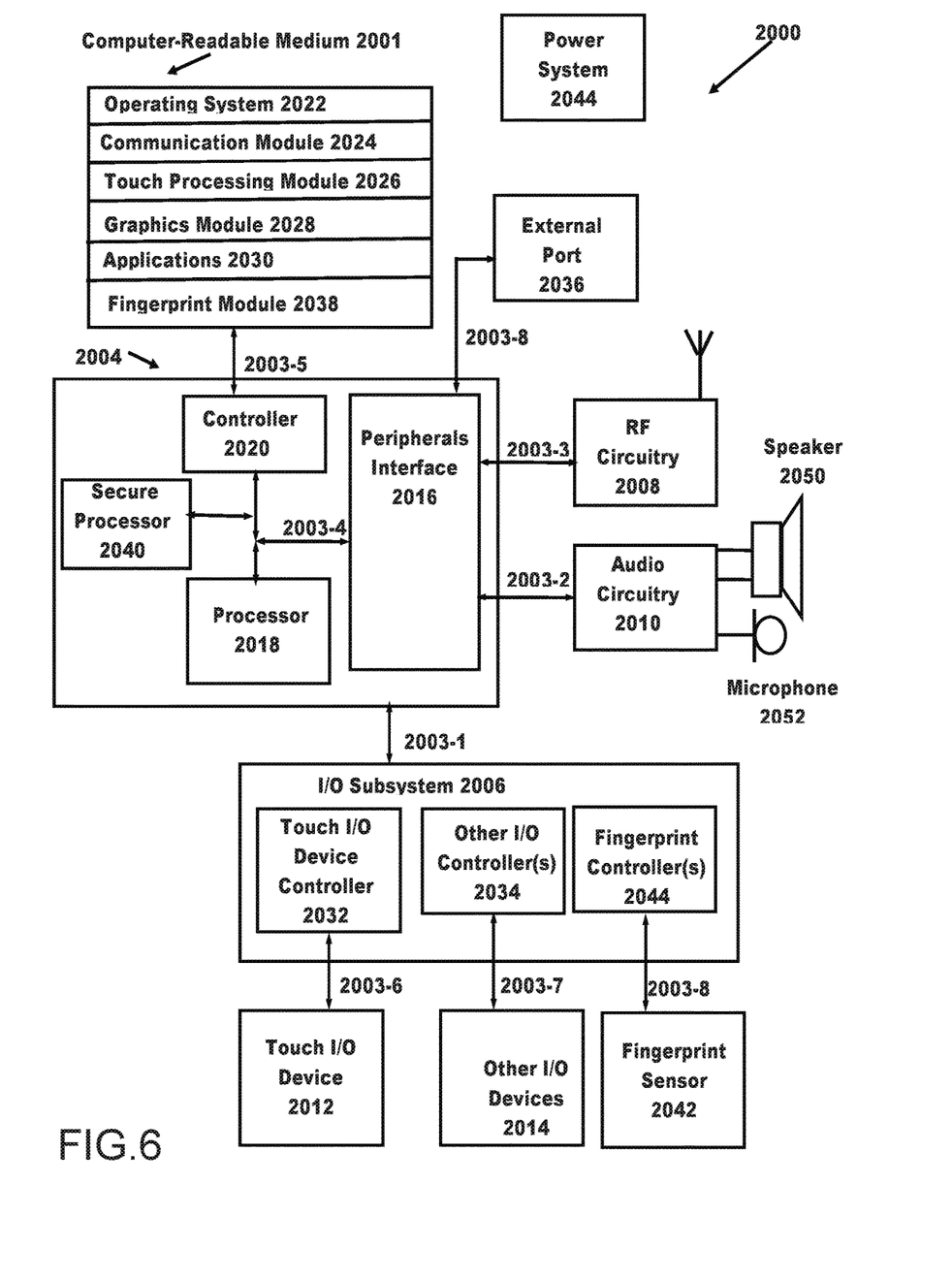
FIG. 6 shows a conceptual drawing of a system including a fingerprint recognition device.

FIG. 6 shows a conceptual drawing of a system including a fingerprint recognition device.

Attention is now directed towards embodiments of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. A block diagram of one embodiment of system 2000 generally includes one or more computer-readable media 2001, processing system 2004, Input/Output (I/O) subsystem 2006, radio frequency (RF) circuitry 2008 and audio circuitry 2010. These components may be coupled by one or more communication buses or signal lines 2003. Each such bus or signal line may be denoted in the form 2003-X, where X is a unique number. The bus or signal line may carry data of the appropriate type between components; each bus or signal line may differ from other buses/lines, but may perform generally similar operations.

It should be apparent that the architecture shown in the figure is only one example architecture of system 2000, and that system 2000 could have more or fewer components than shown, or a different configuration of components. The various components shown in the figure can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some embodiments, audio circuitry 2010 includes a headphone jack (not shown).

Peripherals interface 2016 couples the input and output peripherals of the system to processor 2018 and computer-readable medium 2001. One or more processors 2018 communicate with one or more computer-readable media 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some embodiments, the software components include operating system 2022, communication module (or set of instructions) 2024, touch processing module (or set of instructions) 2026, graphics module (or set of instructions) 2028, one or more applications (or set of instructions) 2030, and fingerprint sensing module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions)

need not be implemented as separate software programs, procedures or modules, and thus various subsets of these modules may be combined or otherwise rearranged in various embodiments. In some embodiments, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In embodiments in which touch I/O device 2012 is a touch sensitive display (e.g., touch screen), graphics module 2028 includes components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 includes various software components for performing various tasks associated with touch I/O device 2012 including but not limited to receiving and processing touch input received from I/O device 2012 via touch I/O device controller 2032.

System 2000 may further include fingerprint sensing module 2038 for performing the method/functions as described herein in connection with FIGS. 1-4. Fingerprint sensing module 2038 may at least be executed to, or otherwise function to, perform various tasks associated with the fingerprint sensor, such as receiving and processing fingerprint sensor input. The fingerprint sensing module 2038 may also control certain operational aspects of the fingerprint sensor 2042, such as its capture of fingerprint data and/or transmission of the same to the processor 2018 and/or secure processor 2040. Module 2038 may also interact with the touch I/O device 2012, graphics module 2028 or other graphical display. Module 2038 may be embodied as hardware, software, firmware, or any combination thereof. Although module 2038 is shown to reside within medium 2001, all or portions of module 2038 may be embodied within other components within system 2000 or may be wholly embodied as a separate component within system 2000.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof. Such buttons may be physical or virtual. The buttons may be soft. That is, the button or buttons may be physically shown on a surface, but may not be associated with, or operate, a mechanical switch when pressed or otherwise interacted with.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

For embodiments in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 2016, one or more processors 2018, and memory controller 2020 may be implemented on a single chip, such as processing system 2004. In some other embodiments, they may be implemented on separate chips.

In addition to the foregoing, the system 2000 may include a secure processor 2040 in communication with a fingerprint sensor 2042, via a fingerprint I/O controller 2044. Secure processor 2040 may be implemented as one or more processing units. The operation of these various elements will now be described.

The fingerprint sensor 2042 may operate to capacitively capture a series of images, or nodes. When taken together, these nodes may form a set of fingerprint image information.

A collection of nodes may be referred to herein as a "mesh", "mosaic", "template", or other indicator of fingerprint information. The fingerprint sensor may be located in any suitable portion of the electronic device, such as beneath a display, under or along one or more walls of the device, beneath a button associated with the device, and so on. Such buttons may be physical or virtual. The buttons may be soft. That is, the button or buttons may be an icon or scribed into a surface of the electronic device, but may not physically depress in the manner of a conventional button having a rocker, slider or dome switch. Rather, operation of the button may be accomplished by touching the soft button and sensing that touch. The fingerprint sensor 2042 may be positioned beneath such a soft button in certain implementations. A "soft button" may refer to an input area or region that does not substantially move, for example to depress a switch or mechanically create a contact, when touched or pressed.

Each node of fingerprint information may be separately captured by the fingerprint sensor 2042, which may be an array sensor. Generally, there is some overlap between images in nodes representing adjacent portions of a fingerprint. Such overlap may assist in assembling the fingerprint from the nodes, as various image recognition techniques may be employed to use the overlap to properly identify and/or align adjacent nodes in the fingerprint information.

Sensed fingerprint data may be transmitted through the fingerprint I/O controller 2044 to the processor 2018 and/or the secure processor 2040. In some embodiments, the data is relayed from the fingerprint I/O controller 2044 to the secure processor 2040 directly. The fingerprint data is encrypted, obfuscated, or otherwise prevented from being accessed by an unauthorized device or element, by any of the fingerprint sensor 2042, the fingerprint I/O controller 2044 or another element prior to being transmitted to either processor. The secure processor 2040 may decrypt the data to reconstruct the node. In some embodiments, unencrypted data may be transmitted directly to the secure processor 2040 from the fingerprint controller 2044 (or the sensor 2042 if no controller is present). The secure processor may then encrypt this data.

Fingerprint data, either as individual nodes, collections of nodes, or substantially complete fingerprint templates, may be stored in the computer-readable medium 2001 and accessed as necessary. In some embodiments, only the secure processor 2040 may access stored fingerprint data, while in other embodiments either the secure processor or the processor 2018 may access such data.

Fingerprint Recognition Sensor

Figure 1:
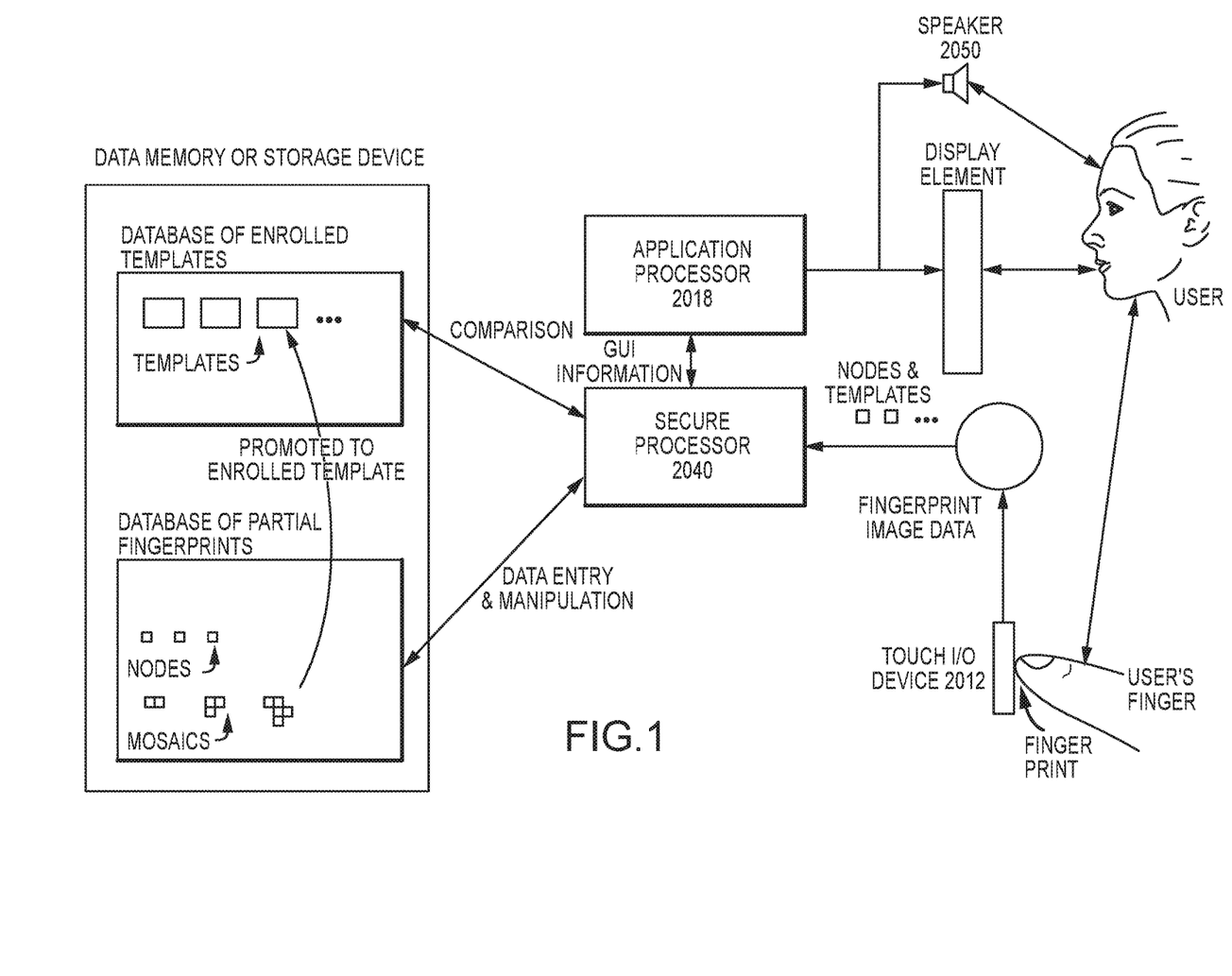
FIG. 1 shows a conceptual drawing of a fingerprint recognition sensor included in a portion of a device.

FIG. 1 shows a conceptual drawing of a fingerprint recognition sensor included in a portion of a device.

A device includes a fingerprint recognition sensor, capable of receiving fingerprint image data, such as from a fingerprint image sensor (optionally including the touch I/O device 2012 described herein) and including one or more processing units (such as the processor 2018 and the secure processor 2040 described herein), maintaining a database of fingerprint information, such as one or more enrolled templates, and comparing received fingerprints with those enrolled templates. The fingerprint recognition sensor can include a set of instructions which can be interpreted or executed by a processor. The fingerprint recognition sensor can include, or have access to, memory or storage in which it can maintain and manipulate fingerprint information, such as one or more databases of fingerprint information which can be used to manipulate and compare fingerprint information, as described herein In one embodiment, each database of fingerprint information can include a set of fingerprint image data, which can include a set of fingerprint image nodes, such as responsive to the touch I/O device 2012 described herein. For example, each set of fingerprint image nodes can include an 8×8 block of image fingerprint image data received from the operation of the fingerprint recognition sensor, and maintained in memory or storage included with or accessible to the processing unit. Each database of fingerprint information can include a set of fingerprint image mosaics and templates, determined by the processing unit in response to the fingerprint image nodes, and similarly maintained in memory or storage included with or accessible to the processing unit.

The fingerprint recognition sensor can receive fingerprints associated with an authorized user, determine a template in response to those received fingerprints, and enroll that template in that database of fingerprint information. The fingerprint recognition sensor can receive new fingerprints, match those new fingerprints with those enrolled templates, and determine if those new fingerprints are also associated with that authorized user, and if so, what credentials are associated with that enrolled template. The fingerprint sensor may receive or capture fingerprint image nodes during a user's operation of a device. For example, nodes may be captured as a use presses a button or interacts with a surface (such as a touch screen) overlaying the fingerprint sensor, even if the interaction is not an attempt to enroll a user. Continuing the example, the fingerprint sensor may capture nodes while a user plays a game on the electronic device, places a telephone call, or otherwise provides input to the electronic device. Such nodes may be fragmentary portions of a fingerprint and an entire fingerprint may not be captured during a single user session. Accordingly, the nodes may be stored in a database for later processing in order to create a unified image of a fingerprint, which may then be enrolled with the device or otherwise registered by the device to provide authorization or access to particular functions.

The fingerprint recognition sensor also includes a database of non-enrolled fingerprint information, such as one or more nodes, and such as one or more mosaics. The fingerprint recognition sensor can receive one or more nodes, maintain a database of node information, and maintain a database of mosaic information.

The fingerprint recognition sensor can match first nodes and mosaics with second nodes and mosaics, and determine whether to combine those first nodes and mosaics with those second nodes and mosaics. The fingerprint recognition sensor can determine, for each mosaic, whether that mosaic is sufficiently complete to be enrolled as a template.

Linking Individual Nodes

Figure 2:
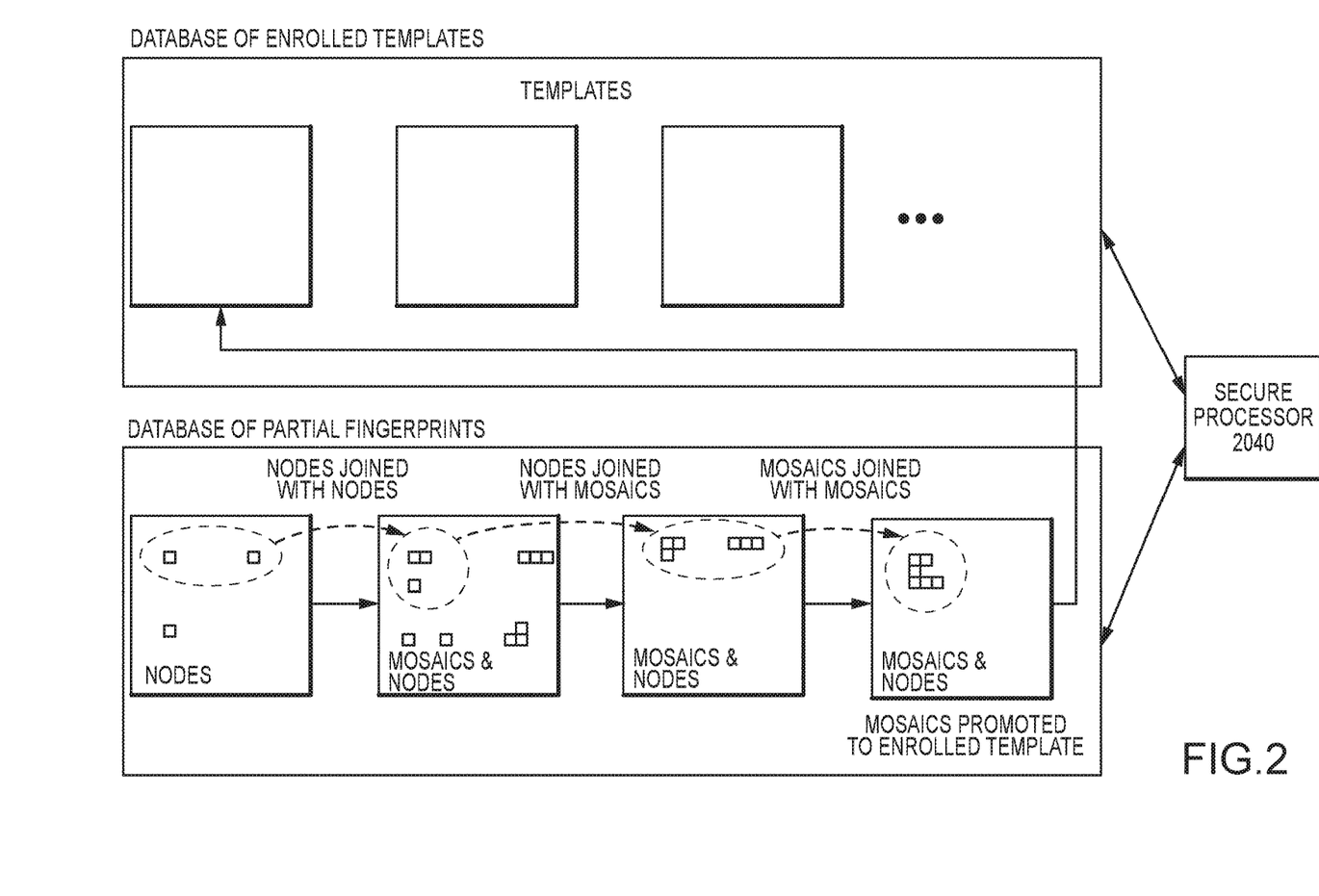
FIG. 2 shows a conceptual drawing of a set of individual fingerprint nodes being linked into a fingerprint mesh and enrolled as a fingerprint template.

FIG. 2 shows a conceptual drawing of a set of individual fingerprint nodes being linked into a fingerprint mosaic and enrolled as a fingerprint template. As described herein, processed fingerprint image data, including individual nodes, mosaics, can be maintained in memory or storage and manipulated by a computing device, in response to and interactively with a physical contact or proximity to one or more of a user's fingerprints.

A database of non-enrolled fingerprint information can include one or more individual nodes. In one embodiment, each time a user touches (or has their fingerprint otherwise sensed by) the fingerprint recognition sensor, if the fingerprint recognition sensor is unable to recognize an entire fingerprint for comparison, the fingerprint recognition sensor can instead identify one or more nodes. For example, each node can include a block of fingerprint data's, which can be processed to determine fingerprint information about that node. Fingerprint information about that node can include a set of ridge flow information, a set of edge matching information, or other information from which the fingerprint recognition sensor can determine whether that node can eventually be combined with any other node into a unified fingerprint template.

In one embodiment, the fingerprint recognition sensor maintains a record of a set of nodes, and maintains a record of a set of mosaics, where each mosaic includes a collection of nodes which the fingerprint recognition sensor has determined should be included in a unified template. For a first example, if a first node and a second node match well along an edge, the fingerprint recognition sensor can collect those nodes into a mosaic. For a second example, if a node matches well with any of the nodes in the mosaic, the fingerprint recognition sensor can collect that node with that mosaic and expand the mosaic to a larger mosaic. For a third example, if a first mosaic and a second mosaic include nodes which match well, the fingerprint recognition sensor can collect those mosaics into a larger mosaic which includes the nodes from both of them. For a fourth example, if a node matches well with any of the nodes in both the first mosaic and the second mosaic, the fingerprint recognition sensor can collect those mosaics into a larger mosaic which includes the nodes from both of them, as well as the new node which matched both mosaics. This has the effect that, as nodes are discovered which match, they are collected into mosaics, the mosaics grow in size, and the mosaics can be collected into larger mosaics.

In one embodiment, the fingerprint recognition sensor can determine if and when a mosaic has sufficient information to comprise a complete template, so that the mosaic can be enrolled as a new template. If so, the fingerprint recognition sensor can enroll the mosaic as a new template, associate that template with a user, and associate that template with appropriate credentials, such as those credentials afforded to that user. This has the effect that a new template can be collected from individual nodes, without an authorized user interacting with a user interface to enroll that new template.

In one embodiment, the fingerprint recognition sensor can make the determination of whether the mosaic should be enrolled as a new template in response to one or more factors. For a first example, the mosaic can be enrolled in response to a number of nodes it includes. In particular, when a mosaic includes 9 or more nodes, it can be declared sufficiently complete to be enrolled as a template. For a second example, the mosaic can be enrolled in response to a diameter of a region it covers. In particular, when a mosaic has a diameter of 4 or more nodes in Euclidean distance (or 6 or more nodes in Manhattan distance), it can be declared sufficiently complete to be enrolled as a template. For a third example, the mosaic can be enrolled in response to a degree of confidence that the fingerprint recognition sensor has with respect to whether the mosaic can be used to match fingerprints for authorization.

In one embodiment, templates that are collected from mosaics, and ultimately from individual nodes, are assigned a relatively lesser importance than templates that are collected by the authorized user interacting with a user interface to enroll that new template. Templates that are collected from mosaics can be removed if they fail to match any whole fingerprints when the fingerprint recognition sensor attempts to authorize a user. For a first example, if a template collected from mosaics is not usable for some time duration or for some number of attempts (or some other measure of inaccuracy or lack of usefulness), that template can be de-enrolled. For a second example, that template can be demoted to a mosaic and possibly altered to improve its utility, as described below.

Matching Nodes With A Mosaic

Figure 3:
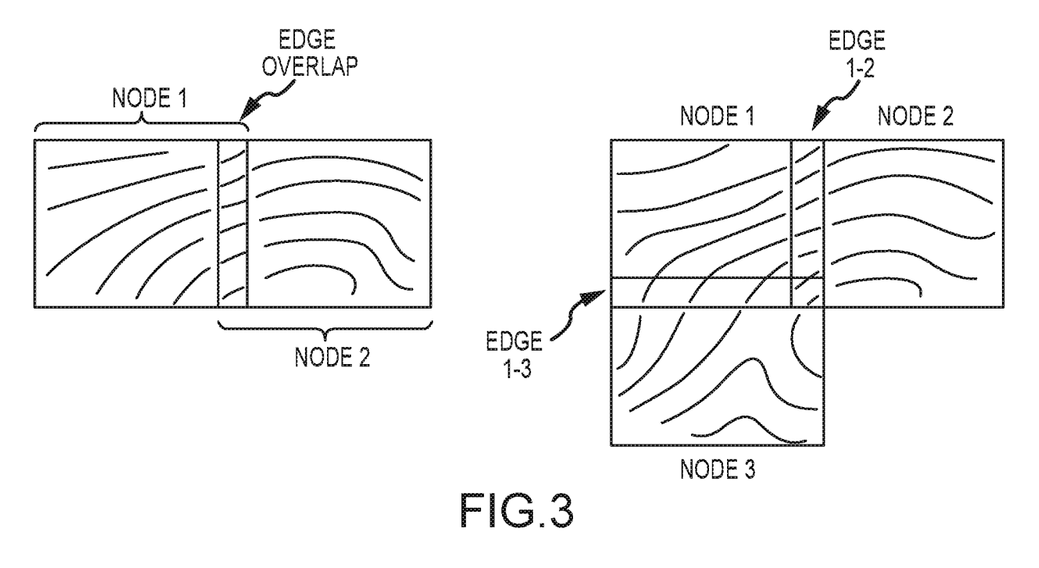
FIG. 3 shows a conceptual drawing of a set of individual fingerprint nodes being matched.

FIG. 3 shows a conceptual drawing of a set of individual fingerprint nodes being matched.

In one embodiment, the fingerprint recognition sensor matches nodes by determining whether they are sufficiently alike in an overlapping region. For a first example, if nodes each include an 8×8 block of data captured by fingerprint data's, the fingerprint recognition sensor can assert that a first node matches a second node if a sufficient number of data points in a 2×8 overlapping stripe are identical or nearly identical, for example when adjusted for gain of the fingerprint data's. For a second example, the fingerprint recognition sensor can assert that a first node matches a second node if there is a match between the first and second nodes for one or more of: a ridge flow, a ridge flow gradient, or another set of fingerprint information derived from fingerprint image fingerprint data's.

In one embodiment, when a first node and a second node match well along a designated edge, the fingerprint recognition sensor need not look to that designated edge for further matching new nodes. In alternative embodiments, the fingerprint recognition sensor can downgrade that designated edge when searching its database of nodes and mosaics for matching a new node. For example, the fingerprint recognition sensor can assign a priority to searching for a new match at the designated edge, such as a priority which is lower when the match along the designated edge is better.

In one embodiment, the fingerprint recognition sensor determines how many matches there are between common edges of a first mosaic and a second mosaic. For a first example, if there is only a single such match, the fingerprint recognition sensor can collect those mosaics only tentatively, while if there is more than one such match, the fingerprint recognition sensor can collect those mosaics more definitively. For a second example, the fingerprint recognition sensor can assign a measure of confidence to collecting those mosaics, in response to how many matches there are at designed edges of those mosaics (and whether matches at those designed edges are physically feasible).

More generally, the fingerprint recognition sensor can assign a measure of confidence to each match it determines, with the effect that each time the fingerprint recognition sensor collects a first node with a second node, or a node with a mosaic, or a first mosaic with a second mosaic, it can recompute that measure of confidence with respect to whether the collection is reasonable. For a first example, the fingerprint recognition sensor can increase its confidence for collecting nodes or mosaics if there are multiple independent reasons to do so. For a second example, the fingerprint recognition sensor can maintain a record of which attempts to collect nodes and mosaics are relatively higher confidence, with the effect that if the fingerprint recognition sensor needs to revert its attempt to collect nodes or mosaics, it can start at the least-confident joining place.

One case in which the fingerprint recognition sensor might desire to revert its attempt to collect nodes or mosaics can occur when nodes are collected from more than one user, and which can be matched, either because matching is performed relatively aggressively or because those nodes match by coincidence. Fingerprints are generally believed to be unique to individuals, but it is possible that a portion of a fingerprint from one person might match a portion of a fingerprint from another person. In such cases, the fingerprint recognition sensor would find that the collected mosaic, or an enrolled template derived from that mosaic, would not match a fingerprint from either single user, with the effect that the fingerprint recognition sensor would desire to either discard that template, or to revert the join of those nodes or mosaics.

In one embodiment, the fingerprint recognition sensor can use other information about a node to determine its measure of confidence in whether to connect that node with another node or with a mosaic. For a first example, if the node to be joined includes relatively less entropy or relatively less information, the fingerprint recognition sensor can assign that node, and any attempt to join that node, less confidence. For a second example, the fingerprint recognition sensor can compute its measure of confidence in response to the amount of entropy or information in that node, or in the edge where that node is to be joined.

More generally, the information which the fingerprint recognition sensor uses to determine its measure of confidence can include any information it has available about the node, such as (A) how long ago the node was collected, (B) how long the node has gone without any matches, or since its most recent match, (C) how far away the node is from the largest mosaic, or the nearest mosaic exceeding a threshold size, (D) whether two nodes to be matched have similar entropy, or similar amounts of information, or otherwise.

The fingerprint recognition sensor can also use information with respect to its confidence in a node to determine whether it should remove the node entirely. For example, if a node was collected a relatively long time ago, has not ever matched any other node, and has relatively low entropy, the fingerprint recognition sensor can determine that the node does not have sufficient value to retain it.

The fingerprint recognition sensor can also use information with respect to its confidence in a node to determine in what order to search nodes to see if any match with a newly acquired node or with a recently constructed mosaic. For example, if a node is relatively recent, the fingerprint recognition sensor can assign it a relatively higher priority when searching for matching nodes. Similarly, if a mosaic was created relatively recently, the fingerprint recognition sensor can assign it a relatively higher priority when searching for matching nodes to expand that mosaic.

Expanding A Template

Figure 4:
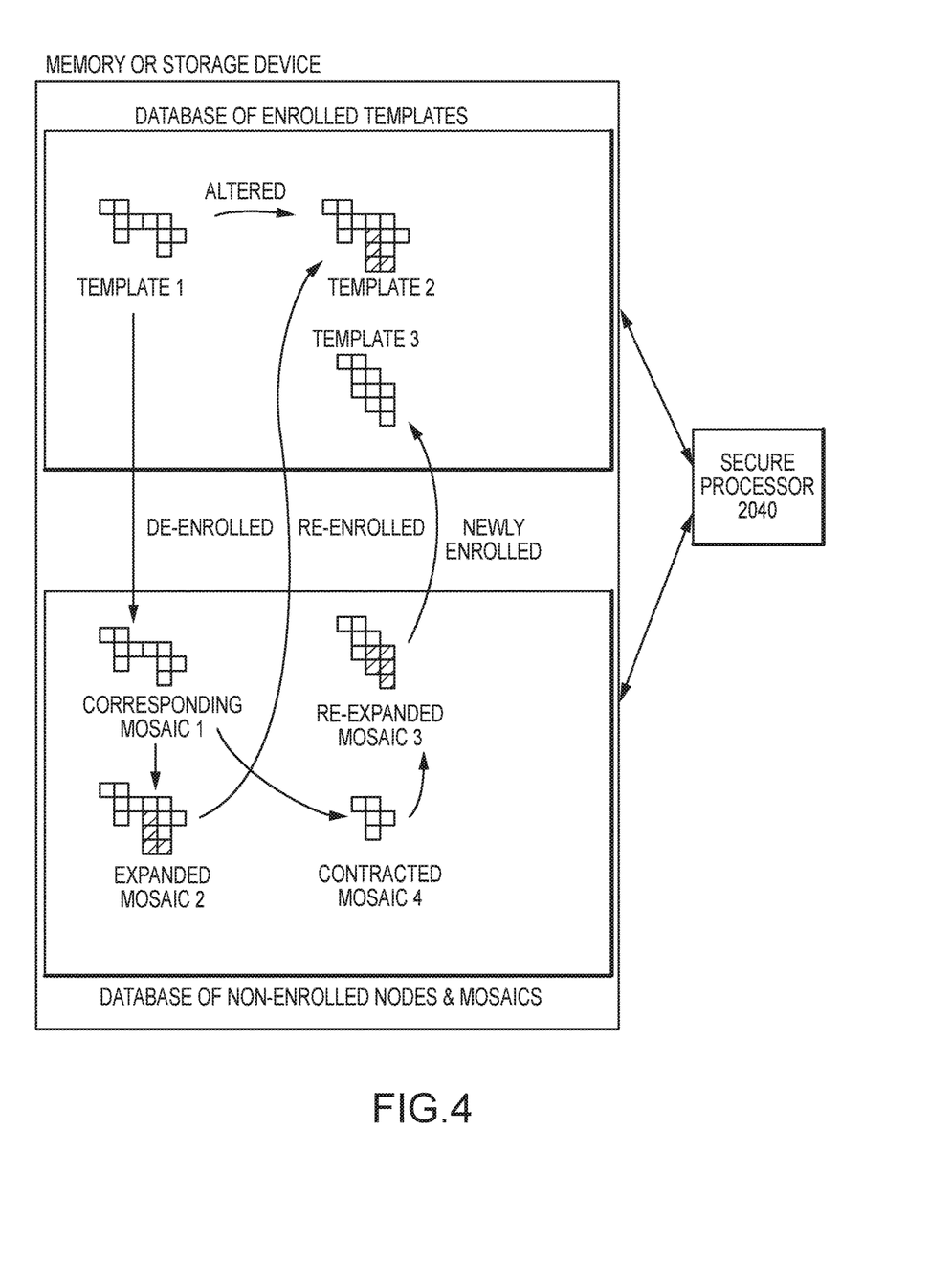
FIG. 4 shows a conceptual drawing of a fingerprint template being tentatively expanded with additional individual fingerprint nodes.

FIG. 4 shows a conceptual drawing of a fingerprint template being tentatively expanded with additional individual fingerprint nodes. As described herein, the nodes, mosaics, and templates derived from a fingerprint image can be maintained in memory or storage and manipulated by a computing device, in response to and interactively with a physical contact or proximity to one or more of a user's fingerprints.

In one embodiment, when the fingerprint recognition sensor determines that a mosaic is sufficiently complete to be enrolled as a template, it might occur that the fingerprint recognition sensor later finds additional information that can be added to that template. For a first example, as noted above, the fingerprint recognition sensor might determine that the template fails to match any actual user fingerprint, and must be discarded or alternatively, disjoined at some place. For a second example, the fingerprint recognition sensor might receive one or more additional nodes or identify one or more mosaics that can be joined with the template.

In one embodiment, the fingerprint recognition sensor can attempt to modify the enrolled template. For a first example, the fingerprint recognition sensor might modify the enrolled template directly. For a second example, the fingerprint recognition sensor might maintain the enrolled template as a mosaic in its database of non-enrolled fingerprint information, marking that mosaic as corresponding to an enrolled template and retaining the option to modify the mosaic and possibly re-enroll it.

In one embodiment, the fingerprint recognition sensor can follow the second described example. When a template is identified that the fingerprint recognition sensor desires to modify, the fingerprint recognition sensor can de-enroll that template, mark the associated mosaic as no longer enrolled, modify the associated mosaic, and re-enroll the modified associated mosaic.

For a first example, if the enrolled template fails to match any actual user fingerprint, it might be the case that the fingerprint recognition sensor has mistakenly joined nodes from more than one fingerprint. This might occur because an individual user has more than one finger with nodes that matched well, or this might occur because more than one user have nodes that matched well. In either case, the fingerprint recognition sensor discards the enrolled template, marks the associated mosaic as no longer enrolled, marks the associated mosaic as erroneous, and takes appropriate action.

Appropriate action can include (A) deleting the associated mosaic entirely, or (B) de-joining one or more nodes or mosaics from the associated mosaic. As noted above, if the fingerprint recognition sensor has maintained a record of its confidence in each joining location, the fingerprint recognition sensor can de-join the associated mosaic at the least-confident location (or alternatively, at a relatively less confident location which is otherwise convenient), and mark the de-joined location as not to be re-joined without better evidence in favor thereof.

For a second example, if the enrolled template can be expanded with additional nodes, either by joining it with one or more individual nodes or by joining it with one or more additional mosaics, the fingerprint recognition sensor can join the associated mosaic with that additional information, determine if the revised mosaic should be re-enrolled as a template, and if so, re-enroll the expanded mosaic as an expanded template. In one embodiment, the fingerprint recognition sensor can maintain both the smaller and the larger template as enrolled templates, including metadata to note that both the smaller and the larger template overlap. This has the effect that if the larger template proves to be superior, the smaller template can be de-enrolled and removed. On the other hand, if the larger template proves to be unworkable (such as, as noted above, if two fingerprints are mistakenly conflated), the smaller template can be retained, and the larger template can be de-enrolled and removed.

Automatic Enrollment

In one embodiment, when a fingerprint template is recognized and enrolled, the fingerprint recognition sensor can automatically credential that fingerprint template, either as part of the enrollment process, as part of a process performed after enrollment, or as part of an ongoing automated credentialing process. As previously mentioned, various nodes may be captured during normal operation of an electronic device incorporating or associated with the fingerprint recognition sensor. These nodes may be stored and, over time, accumulated into a mosaic and ultimately a template. The capture of nodes and related fingerprint data may occur without the user's knowledge, while the user otherwise interacts with the electronic device. For a first example, upon enrollment of a fingerprint template, the fingerprint recognition sensor can determine a user associated with that fingerprint template, and automatically associated credentials with that fingerprint template that are already associated with that user. For a second example, upon any update or re-enrollment of that fingerprint template, such as described above, the fingerprint recognition sensor can automatically update the credentials associated with that fingerprint template. For a third example, upon any update of the credentials for a user associated with that fingerprint template, the fingerprint recognition sensor can automatically update the credentials associated with that fingerprint template to match the credentials for that associated user.

In one embodiment, when a fingerprint template is recognized and enrolled, the fingerprint recognition sensor can automatically notify the user, or take some other selected action. For a first example, the fingerprint recognition sensor can automatically notify the user when the fingerprint template is recognized and enrolled. As part of this notification, the fingerprint recognition sensor can take other appropriate action, such as possibly (A) asking the user to confirm enrollment, (B) asking the user to confirm credentials to be associated with the fingerprint template, (C) asking the user to enter a PIN or other code to confirm they are the correct user. For a second example, the fingerprint recognition sensor can automatically take some other selected action, such as a system action, such as maintaining a record of enrolled fingerprints and the time and place they were enrolled.

Figure 7:
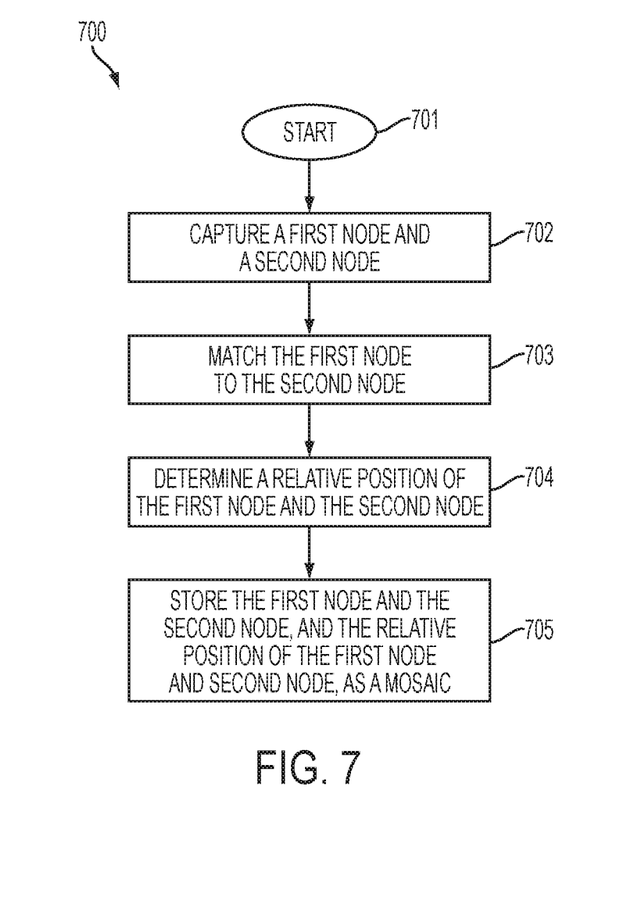
FIG. 7 is a flow chart illustrating an example method for generating a data set corresponding to a fingerprint through operations of an electronic device.

FIG. 7 is a flow chart illustrating a method 700 for generating a data set corresponding to a fingerprint through operations of an electronic device. The electronic device may be the device of FIG. 1. The method may start at a block 701 and the flow may proceed to block 702 where a first node and a second node may be captured, such as by a fingerprint sensor of the electronic device. The flow may then proceed to block 703 where the first node is matched to the second node. The flow may then proceed to block 704 where a relative position of the first node and the second node is determined. Next, the flow may proceed to block 705 where the first node and the second node, and the relative position of the first node and second node, are stored as a mosaic. In some cases, capture of one or more of the first node and second node may be performed by a fingerprint sensor during an interaction with an electronic device other than a dedicated enrollment action.

As described above and illustrated in the accompanying drawings, this application provides techniques, including circuits and designs, which can receive information with respect to fingerprint images, or portions thereof, and which can be incorporated into devices using fingerprint recognition. This application also provides techniques, including devices which perform fingerprint recognition and methods which can be performed by those devices. In one embodiment, techniques can include providing a fingerprint recognition sensor in which one or more portions of each fingerprint can be collected as they are identified, and those portions can be combined into a unified fingerprint template. In this way, collection and enrollment of fingerprints may be simplified for users.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

What is claimed is:

1. An electronic device, comprising:
 a fingerprint sensor;
 a first processing element operatively connected to the fingerprint sensor;
 a first database operatively connected to the first processing element, the first database storing a set of data corresponding to non-enrolled fragments of one or more fingerprints captured by the fingerprint sensor during an interaction with the fingerprint sensor; and
 a second database operatively connected to the first processing element, the second database storing one or more enrolled templates; wherein
 the first processing element is operative to:
  determine when a plurality of the non-enrolled fragments match along at least one edge;
  combine the plurality of the non-enrolled fragments that match along the at least one edge to form a template;
  maintain one or more non-enrolled fragments that do not match along at least one edge in the first database; and
  store the template in the second database, the stored template comprising an enrolled template.

2. The electronic device of claim 1, wherein the first processing element is further operative to remove the plurality of the non-enrolled fragments that match along the at least one edge from the first database once the template is formed.

3. The electronic device of claim 2, further comprising a second processing element operatively connected to the first processing element; wherein the first processing element is secure and interacts only with the second processing element, the first and the second databases, and the fingerprint sensor.

4. The electronic device of claim 3, wherein the second processing element is operatively connected to at least one output device.

5. The electronic device of claim 4, wherein the at least one output device comprises a touch-sensitive display.

6. The electronic device of claim 4, wherein the first processing element generates the first set of data by decrypting encrypted information transmitted from the fingerprint sensor, the encrypted information relating to fragments of one or more fingerprints.

7. The electronic device of claim 1, wherein the first database is operative to store one or more mosaics, each of the one or more mosaics being formed from a plurality of the non-enrolled fragments, wherein each of the one or more mosaics is less than a data set corresponding to a portion of a fingerprint sufficient to identify a person.

8. The electronic device of claim 7, wherein the plurality of the non-enrolled fragments comprises a first non-enrolled fragment and a second non-enrolled fragment and the first processing element is operative to determine an edge overlap between the first and the second non-enrolled fragments and, in response thereto, generate a mosaic from the first and the second non-enrolled fragments.

9. The electronic device of claim 1, wherein each of the fragments is captured during an interaction with the electronic device other than a dedicated enrollment interaction.

10. The electronic device of claim 9, wherein:
 the set of templates are separated into a first template group and a second template group; wherein
 the first template group contains only templates formed from a series of fragments obtained during a dedicated enrollment interaction; and
 the second template group contains templates formed from a series of fragments, at least one of the series of fragments forming each template obtained during an interaction with the electronic device other than a dedicated enrollment action.

11. The electronic device of claim 10, wherein the first processing element is operative to remove a template of the second template group if the template of the second template group does not match a fingerprint obtained during a series of dedicated enrollment actions.

12. A method for generating a template corresponding to a fingerprint through operations of an electronic device, the method comprising:
 storing, in a database of non-enrolled partial fingerprints, a first node, a second node, and a third node or a first mosaic;
 matching an edge of the first node to an edge of the second node;
 combining the first node and the second node into a second mosaic and storing the second mosaic in the database of non-enrolled partial fingerprints;
 combining the second mosaic and the third node or the first mosaic into a larger third mosaic when an edge of the second mosaic matches an edge of the first mosaic or the third node; and
 storing the third mosaic as the template in a database of enrolled templates if the third mosaic comprises a complete template; and
 storing the third mosaic in the database of non-enrolled partial fingerprints if the third mosaic does not comprise the complete template.

13. The method of claim 12, wherein the operation of matching the first node to the second node comprises:
 comparing data adjacent an edge of the first node to data adjacent an edge of the second node; and
 in the event the data is sufficiently similar, matching the edge of the first node to the edge of the second node.

14. The method of claim 13, wherein the data is chosen from the group comprising: ridge flow data; ridge flow gradient data; and capacitively-sensed fingerprint data.

15. The method of claim 13, further comprising:
 downgrading the edge of the first node in priority for later matching operations; and
 downgrading the edge of the second node in priority for later matching operations.

16. The method of claim 13, further comprising:
 adjusting a confidence of a match based on at least one of: an age of the first node; a duration of time since the first node was last match; a distance of the first node from a largest mosaic; and an entropy of the first node.

17. The method of claim 13, further comprising:
 determining a confidence of the first node; and
 in the event the confidence of the first node is low, discarding the first node; wherein
 the operation of comparing data adjacent an edge of the first node to data adjacent an edge of the second node occurs only if the first node has not been discarded.

18. An electronic device, comprising:
 a processor; and
 a memory coupled to the processor, the memory for storing instructions which, when executed by the processor, performs a method for reconstructing an image of a fingerprint, the method comprising:

capturing a first portion of a fingerprint during a first non-enrollment interaction with the electronic device;

capturing a second portion of the fingerprint during a second non-enrollment interaction with the electronic device;

storing the first and the second portions of the fingerprint in a first database comprising non-enrolled portions of the fingerprint;

comparing an edge of the first portion to an edge of the second portion;

creating a fingerprint template using the first portion and the second portion when the comparison exceeds a confidence match threshold; and storing the fingerprint template in a second database comprising one or more enrolled templates.

19. The electronic device of claim 18, wherein the method further comprises:

capturing a third portion of the fingerprint during the second non-enrollment interaction with the electronic device;

storing the third portion of the fingerprint in the first database comprising non-enrolled portions of the fingerprint; and continuing to store the third portion in the first database upon storing the fingerprint template in the second database.

20. The electronic device of claim 18, wherein the method further comprises removing the first and second portions from the first database once the template is created.

* * * * *